Patented June 10, 1930

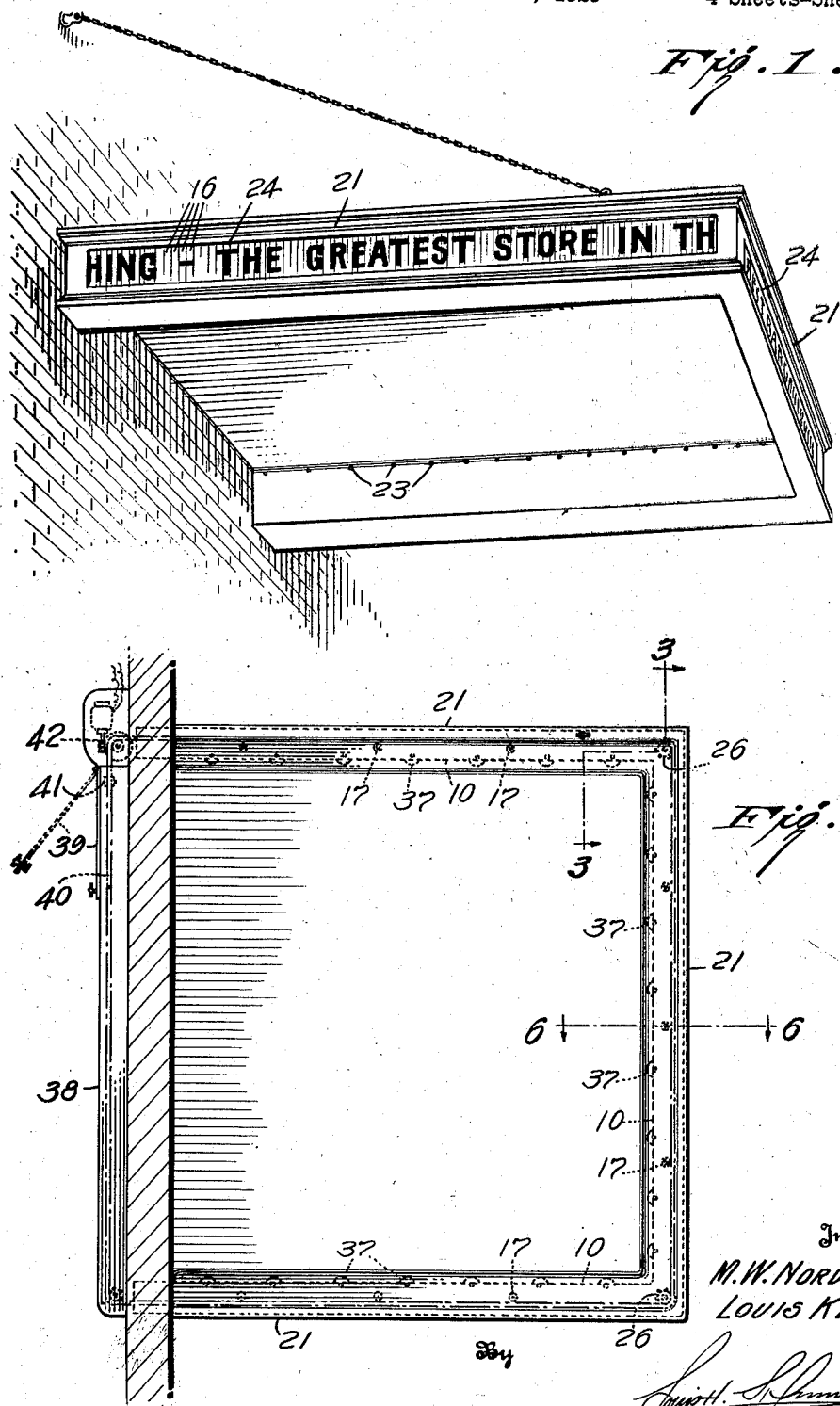

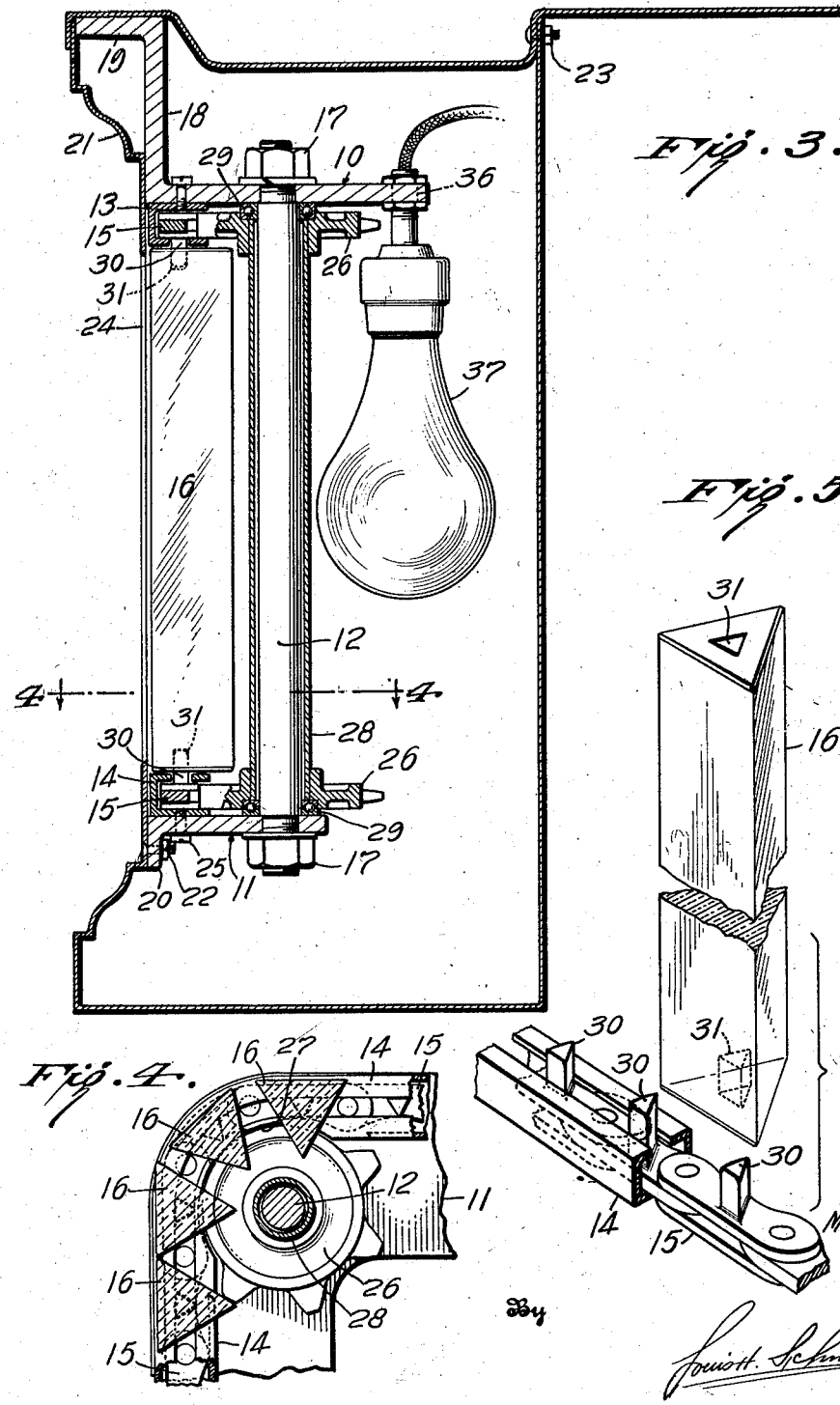

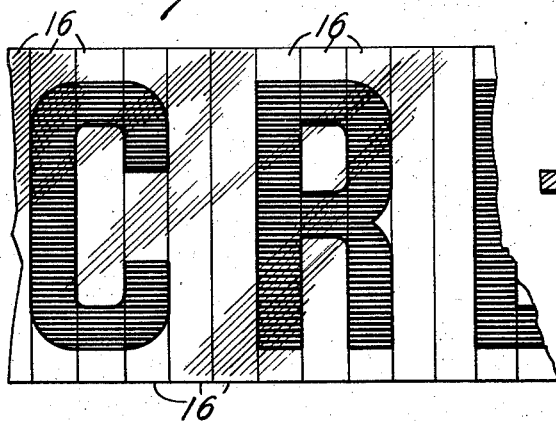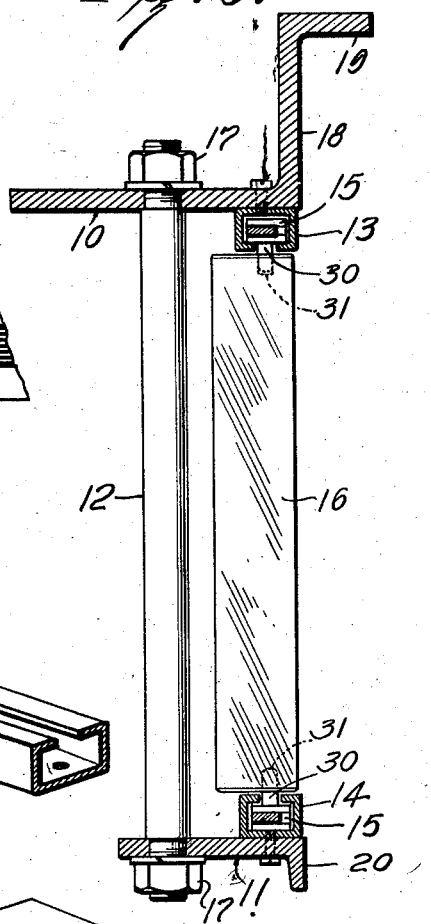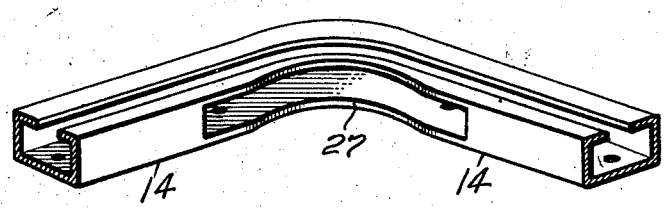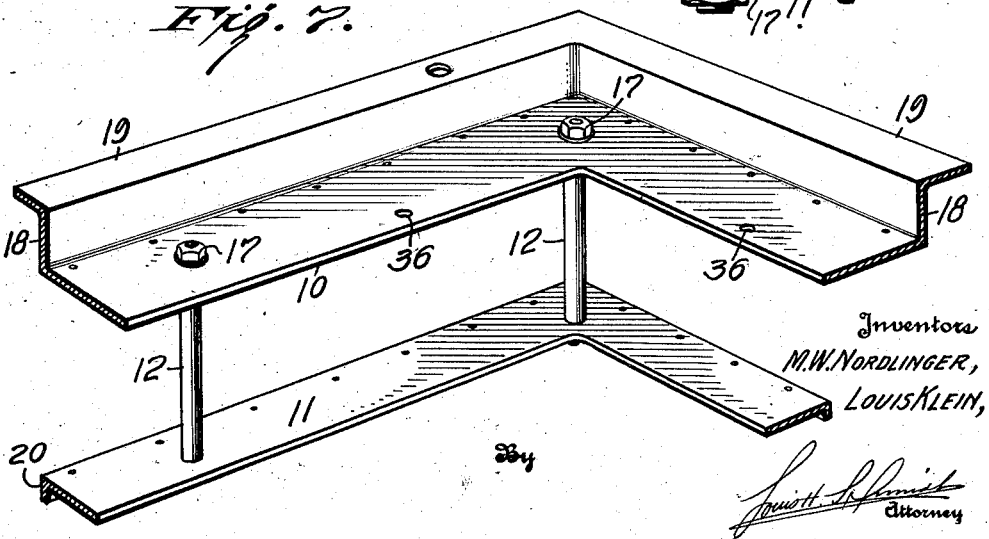

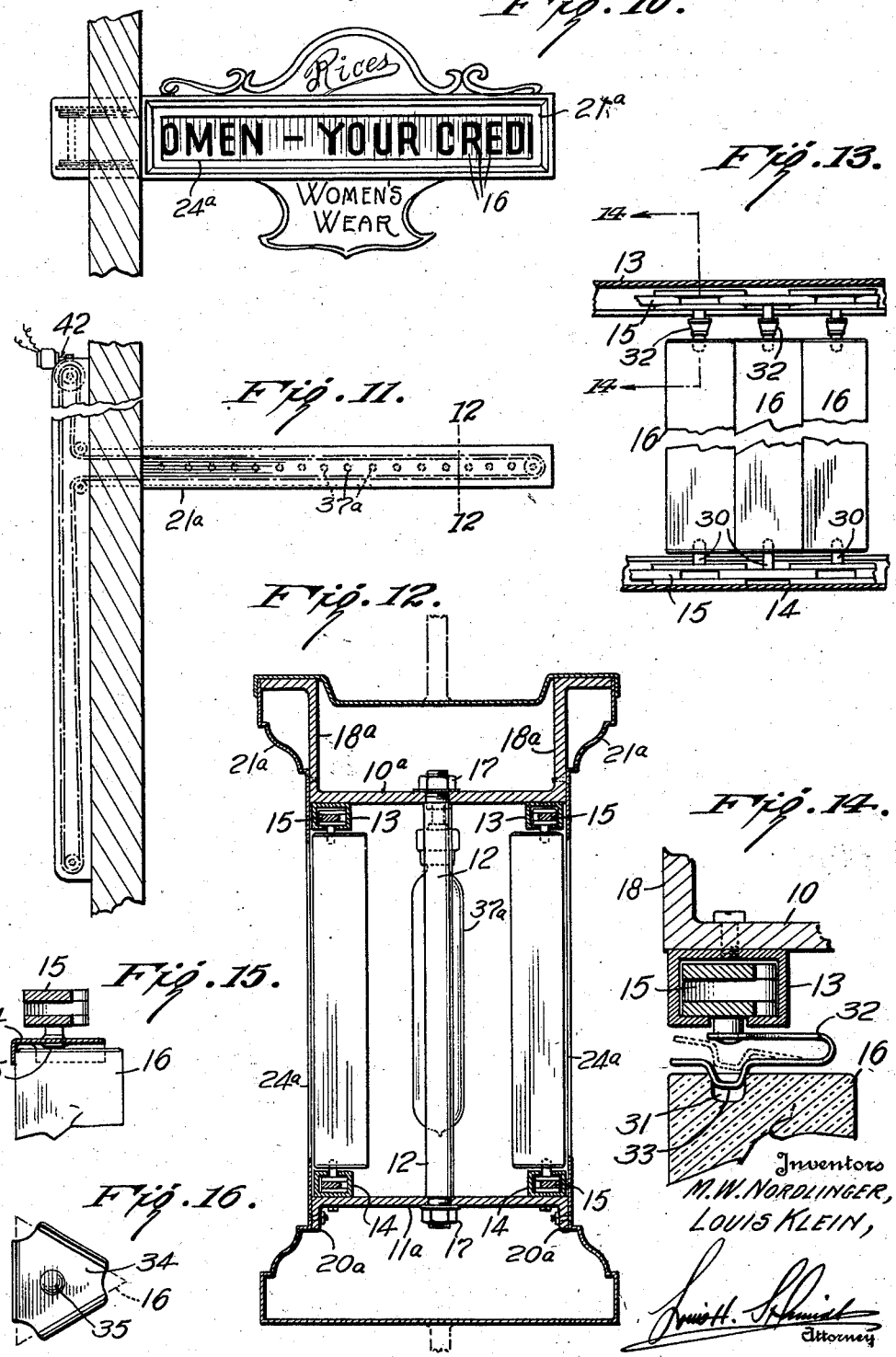

1,763,317

UNITED STATES PATENT OFFICE

MAURICE W. NORDLINGER AND LOUIS KLEIN, OF NORFOLK, VIRGINIA

DISPLAY APPARATUS

Application filed June 6, 1929. Serial No. 368,851.

Our invention relates to display apparatus in general and particularly to advertising signs that may be used in various ways and under varying conditions, an object being to improve such apparatus so that the very effective result will be produced, whereby the indicia may be easily changed, and due to the simplicity of construction and novel arrangement of parts, may be readily installed in position. It will be understood that we do not limit ourselves to the construction shown and described but include within the scope of our invention whatever construction may follow within the appended claims.

In the drawings:—

Figure 1 is a view in perspective, illustrating one embodiment of our invention;

Figure 2 is a top plan view thereof;

Figure 3 is a transverse sectional view on the line 3—3 of Figure 2;

Figure 4 is a detail sectional view on the line 4—4 of Figure 3;

Figure 5 is a fragmentary perspective view showing one of the prisms disassociated with respect to one of its supporting chains;

Figure 6 is a transverse sectional view on the line 6—6 of Figure 2;

Figure 7 is a view in perspective of portions of the upper and lower frame members and their respective connecting rods;

Figure 8 is a view in perspective of a corner section of one of the lower tracks;

Figure 9 is a somewhat diagrammatic elevation of a series of prisms illustrating one of the forms of producing advertising;

Figure 10 is a side elevation of another embodiment of our invention;

Figure 11 is a top plan view thereof;

Figure 12 illustrates a transverse sectional view along the line 12—12 of Figure 11;

Figure 13 is a sectional view, parts broken away, illustrating the prisms together with the upper and lower supporting means;

Figure 14 is a detail sectional view taken on the line 14—14 of Figure 13 looking in the direction of the arrows; and Figures 15 and 16 illustrate another means of fastening the prisms to the traveling chain.

Our invention, in the forms or embodiments shown in the drawings, and briefly described, comprises upper and lower frame sections 10 and 11, supporting rods 12, upper and lower continuous tracks 13 and 14, chains 15 arranged for movement within these tracks, and a plurality of closely arranged prisms 16.

For the purpose of readily assembling the several elements of our display apparatus and, at the same time, provide a construction which will be very light in weight and require the minimum amount of attention, we have formed the upper and lower frame sections 10 and 11 of comparatively light metallic angles. These may be formed of single pieces or they may be joined by welding or riveting. The plurality of vertically extending connecting rods 12 are preferably formed with reduced threaded portions which are adapted to pass through suitable openings in the frame sections 10 and 11, and suitably space these sections and secure them against displacement by means of the nuts 17. It may be here stated that the upper frame section 10 is provided with an upwardly extending portion 18, and an outwardly extending projection 19, whereas the lower frame section 11 is provided with a downwardly extending leg portion 20. These extensions of the frame sections, it will be readily seen, provide a ready means of support for the ornamental casing 21. As clearly shown in Figure 3 of the accompanying drawings, it is merely necessary to secure the ornamental casing to the leg 20 by means of the bolts 22. With further reference to this figure, it will be noted that we provide a roof or upper covering which may be readily secured to the ornamental casing, as indicated at 23. This very sturdy and rigid assembly may be readily supported in position by means of chains, as shown, or it may be held in any other desired manner. Suitable openings, indicated at 24, are, of course, provided in the ornamental casing, so that the advertising matter may be plainly seen.

Referring now particularly to Figures 3, 4, 5 and 8, wherein is illustrated the continuously formed tracks 13 and 14, it will be noted that they are secured against accidental displacement from their respective frame sections, by means of the screws 25. These guides 13 and 14 are preferably formed of single strips of metal and are suitably curved at the corners, as clearly shown in Figure 4, so as to permit their respective chains to freely move through them without unnecessary friction or binding. In order to permit the proper mating of the sprocket or driving wheels 26 with respect to the chains 15, one of the vertically extending walls of the guide members 13 and 14 is cut away, as shown at 27.

The upper and lower sprocket wheels 26 are preferably connected together by means of a tubular member 28, to which they are secured in any suitable manner. We have also found it desirable to utilize the connecting rods 12 for mounting the sprocket wheels 26. Upper and lower ball bearings 29 are disposed between the sprocket wheels 26 and adjacent frame sections 10 and 11, so that they may operate with the minimum amount of friction.

Each of the chains 15 is provided with a plurality of polygonal lugs 30 for the purpose of supporting the glass prisms 16 in their properly spaced relation. As is clearly shown in the drawings, the lugs 30 may be integrally formed with each of the links comprising the chains and are arranged to project through the slotted or open end of each of the tracks 13 and 14. Since the prisms are triangular in cross section, we prefer to form the openings 31 in the ends thereof, together with the lugs 30 of the same relative shape. This will simplify the manufacture of these prisms and effectually support and prevent their rotation with respect to the lugs. It will be obvious, of course, that the lugs 30 which are formed with the central portion of each link are slightly longer than the lugs which are formed upon the double link sections. It may be also here stated that we prefer to have the prisms 16 supported by the lower set of lugs 30, so that a relatively small space will be provided between the lower ends of the prisms and the upper surface of the lower guide 15. This will eliminate any possible friction between these relatively movable surfaces.

In the embodiment of our invention illustrated in Figures 13 and 14, a somewhat different form of prism securing means is shown. In this instance, flat leaf springs 32 are adapted to have offset portions 33 for the purpose of frictionally engaging the upper opening 31 of each prism, for a purpose to be hereinafter described. Although these leaf springs 32 may be secured to the various links of the chains 15 in any desired manner, we prefer to rivet them, as shown.

Another embodiment of the present invention is also shown in Figures 15 and 16, whereby a plate 34 of the approximate shape of the respective prism is provided with downwardly extending ears or flanges for supporting the prism and preventing its accidental displacement. These plates 34 may likewise be riveted to the several links of the chain 15, as indicated at 35.

Since our advertising device is comprised of a plurality of closely spaced and relatively narrow glass prisms, as clearly shown in Figure 9, a great latitude of lettering may be secured with the minimum number of interchangeable crystals. A strikingly pleasing effect may be produced with these crystals when the lettering is formed with either opaque materials or in desired colored effects. Openings 36 may be suitably formed in the upper frame section 10 for the purpose of supporting the usual electric lighting means, shown at 13.

Instead of employing our invention for use in canopies, we may use it in connection with a sign which extends outwardly from a building. An example of this is illustrated in Figures 10, 11 and 12 of the accompanying drawings. In this embodiment of our invention, the upper and lower frame sections 10ᵃ and 11ᵃ are provided with a pair of casing supporting means, shown as 18ᵃ and 20ᵃ. The upper and lower tracks or guides 13 and 14 together with their associated chains 15 may be identical with the form of our invention above described. The connecting rods 12 preferably connect the upper and lower frame sections at their approximate centers.

For the purpose of readily changing the wording on our advertising apparatus, it may be desirable to have access to the prisms through a suitable opening in the rear casing 38 which would be normally closed by means of the pivotally mounted door 39. In removing or replacing the prisms 16 from the supporting and carrying means, it is merely necessary to provide a relatively small section 40 of the upper guide or track 13 which is movable as, for example, by pivoting, as indicated at 41. It is, of course, obvious that access may be had to the prisms from the outer side of the building instead of the inner side, as illustrated. Although any suitable means may be employed for driving the sprocket chains 15, we have illustrated an electric motor and worm gearing, indicated generally at 42.

It will be appreciated that the movable section of the upper track or guide 13 may be eliminated in connection with the forms of our invention illustrated in Figures 13, 14, 15 and 16. In these instances, the upper ends of the prisms may be snapped or sprung into and out of their exhibiting position, their lower ends acting as a fulcrum.

We claim:—

1. A display apparatus comprising upper and lower frame sections, a plurality of rods for connecting said frame sections and supporting them in their spaced relation, an outer casing arranged to slip over said frame sections and to be secured thereto, a continuously formed guide member secured to each of the upper and lower frame sections, a sprocket chain arranged to be freely slidable within each of the guide members, sprocket wheels disposed adjacent said upper and lower sprocket chains for moving them in unison, and a plurality of closely arranged prisms carried by said chains.

2. A display apparatus comprising upper and lower frame sections, a plurality of rods for connecting said frame sections and supporting them in their spaced relation, an outer casing arranged to slip over said frame sections and to be secured thereto, a continuously formed guide member secured to each of the upper and lower frame sections, a sprocket chain arranged to be freely slidable within each of the guide members and provided with outwardly extending and polygonally formed lugs, sprocket wheels disposed adjacent said upper and lower sprocket chains for moving them in unison, and a plurality of prisms carried between the chains, the ends of each of said prisms being provided with openings for the reception of said lugs.

3. A display apparatus comprising upper and lower frame sections, a plurality of equidistantly spaced rods for connecting the frame sections and maintaining them in their spaced relation, an outer ornamental casing adapted to be slipped over said frame sections and to be secured thereto, a continuously formed guide member having a continuous slot along its entire length, a sprocket chain slidably arranged within the guide member and having secured upon each of the links thereof an outwardly extending lug, sprocket wheels disposed adjacent said upper and lower sprocket chains for moving them in unison, and a plurality of closely arranged glass prisms each having an opening adapted for engagement with one of said lugs.

4. A display apparatus comprising frame sections and a plurality of spacing rods connected therebetween, an outer ornamental casing adaped to fit over said frame sections and secured thereto, a pair of continuously formed guide members secured to the frame, a chain loosely mounted within each of the guide members, a plurality of closely arranged prisms, and means carried by the chains for supporting the prisms and preventing their rotation with respect to said chains.

5. A display apparatus comprising upper and lower frame sections, a plurality of equidistantly spaced rods for connecting said frame sections and supporting them in their spaced relation, a continuously formed guide member carried by each of said frame sections, a sprocket chain arranged to be freely movable within each of the guide members, a plurality of tubular members having sprockets thereon mounted adjacent said chains for driving them in unison, and a plurality of closely arranged glass prisms carried by said chains and arranged to be clear of said guide members.

6. A display apparatus comprising a relatively stationary frame, a pair of continuously formed guide members, a sprocket chain loosely mounted to slide within each of said guide members sprocket wheels adapted to mesh with said chains for driving them, a plurality of closely arranged indicia-carrying prisms, and means interposed between the ends of each of the prisms and their respective chains for permitting said prisms to be readily detached therefrom.

7. A display apparatus comprising upper and lower frame sections, rods for connecting said frame sections and maintaining them in their uniformly spaced relation, a continuously formed guide member secured to each of the frame sections and disposed in diametrically opposed relation, a sprocket chain freely slidable within each of said guide members sprocket wheels adapted to mesh with said chains for driving them, and a plurality of closely arranged indicia-carrying members connected to and movable with respect to said chains.

8. In a display apparatus of the character described, a pair of oppositely disposed guide members, a chain mounted to freely slide within the guide members, each of the links of said chains being provided with oppositely extending lugs, and a plurality of closely arranged prismatic crystals, each end of said prismatic crystals having an opening formed therein adapted for engagement with one of said lugs.

In testimony whereof we affix our signatures.

MAURICE W. NORDLINGER.
LOUIS KLEIN.